June 13, 1950   F. H. MUELLER   2,511,477
VALVE
Filed Jan. 24, 1946

Inventor
Frank H. Mueller,
By Cushman Darby & Cushman
his Attorneys

Patented June 13, 1950

2,511,477

UNITED STATES PATENT OFFICE 2,511,477

VALVE

Frank H. Mueller, Decatur, Ill., assignor to Mueller Co., Decatur, Ill., a corporation of Illinois Application January 24, 1946, Serial No. 643,130

1 Claim. (Cl. 251—96)

Figure 1:
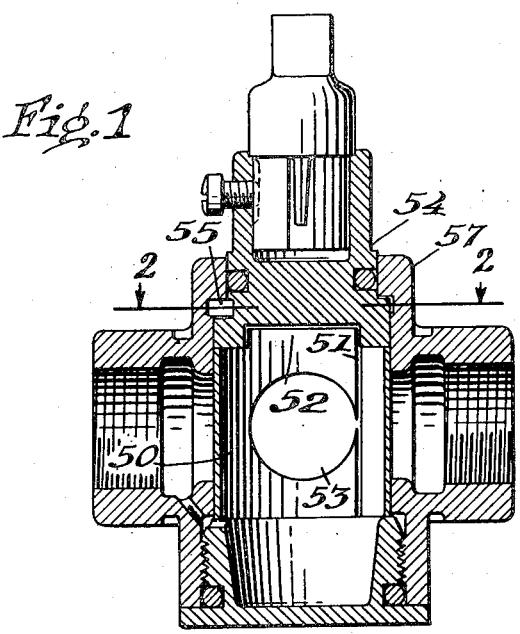
Figure 3:
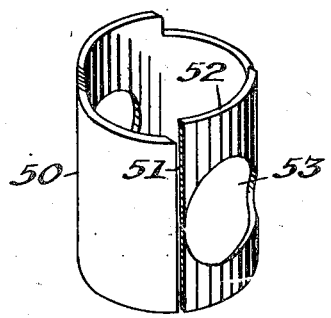
Figure 4:
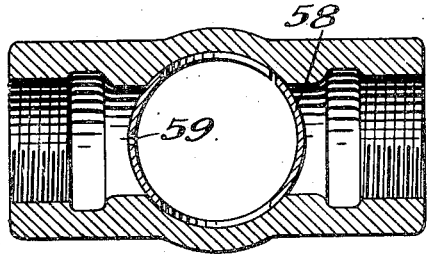
Figure 2:
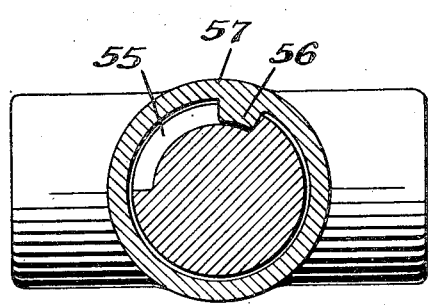

This invention relates to valves embodying expansible sleeves as the control element and has as its principal object to provide a valve of this type wherein, in the off position, a seal is perfected between the sleeve and the valve seat by the expanding effect of inlet pressure communicated to the interior of the sleeve. The invention is shown in practical embodiment in the accompanying drawings in which:

Figure 1 is an axial section of a rotary split sleeve valve, the valve being in off position, Figure 2 is a section on line 2—2 of Figure 1, Figure 3 is a perspective view of the sleeve element of Figure 1 and Figure 4 is a section showing a further modification.

In Figures 1 to 3, the sleeve 50 has the split 51 at the side of extension 52 and just intersects or is tangential to the opening 53. The extensions are received in the channel of an operator 54 provided with an arcuate rabbet 55 in which is engaged a lug 56 projecting inwardly from the neck 57 so that in operating the valve it is turned through 90° between on and off positions. When the valve is in the off position of Figure 1 the split 51 is adjacent the outlet port and overlies the solid seat surface so as to be closed. With the slot thus positioned, that portion of the sleeve overlying the outlet port in the off position of the valve is more sensitive to the internal pressure. Check means are provided for the operator to insure that the split will be adjacent the outlet port when the valve is in off position. Extension 52 has slightly less clearance in the operator channel than the other extension so that, when the valve is turned toward on position, a contracting effect is first exerted on the sleeve. It will be noted that the resilient lap portion of the sleeve between the tangential split 51 and the non-intersected aperture 53 (Figure 3), when the plug is turned to its off position, provides a wide sealing lap portion for engaging the seat and for receiving the fluid pressure acting on the sleeve, so as to insure a tight sealing engagement of the lap portion with the adjacent inner wall of the valve body. Moreover, the split 51 when the parts are in their closed position, is located between the edge of the outlet sleeve aperture 53 and the adjacent or nearest edge of the body outlet (Figure 4), so that the split 51 and the inlet and outlet apertures in the sleeve are closed by the seat on the valve body. In other words, the split 51 is positioned close as possible to the body outlet port, and since the fluid pressure balances on the inside and outside of the sleeve at the inlet port, and as the predominating inner pressure is on the opposite or outlet side, in order to obtain the maximum effect of the internal pressure to provide a seal between the sleeve and the valve body wall, the split 51 is placed where it will be close to the edge of the outlet body port when the sleeve is in its off position. An important advantage of this construction is that a larger outlet port can be formed in the valve body, since the resilient lap portion of the sleeve is sufficiently wide to provide a tight seal with the enlarged outlet port.

In Figure 4 the valve body is the same as in Figures 1 and 2 except that the passage means from the inlet port to the lower end of the sleeve is omitted. The sleeve 58 is exactly like sleeve 50 except that it is provided with an opening 59 which, in the off position, admits inlet pressure to the interior of the sleeve.

It will be understood that the disclosure herein is intended as illustrative and that variations in the form and arrangement of parts are contemplated under the invention as defined in the following claim.

I claim:

A valve comprising a housing, a seat of circular cross-section in said housing, an inlet port and an outlet port intersecting the seat, a longitudinally split resilient sleeve engaging the seat, means for moving the sleeve between on and off positions, said sleeve having diametrically disposed apertures arranged to place said ports in communication with each other in the on position and the split being disposed tangentially to one of said apertures and arranged so as to be opposite a wall portion of the seat closely adjacent a side of the outlet port when the plug is in off position, means for admitting inlet pressure to the interior of the sleeve when the latter is in off position, said sleeve when in off position being expandable into sealing relation with the seat by inlet pressure exerted against the inner wall of the sleeve so as to force the sleeve opposite the split against the body wall around the outlet port, the portion of the sleeve between the split and the aperture adjacent the inlet port providing a wide uninterrupted sealing lap portion for engaging the seat and for receiving the fluid pressure acting thereon so as to insure a tight sealing engagement of the lap portion with the seat when the sleeve is in its off position, and check means for insuring the positioning of the split adjacent the outlet port when the sleeve is in its off position.

FRANK H. MUELLER.

REFERENCES CITED

The following references are of record in the file of this patent:

UNITED STATES PATENTS

| Number | Name | Date |
|---|---|---|
| 1,926,450 | MacGregor | Sept. 12, 1933 |

FOREIGN PATENTS

| Number | Country | Date |
|---|---|---|
| 9,090 | Australia | Sept. 7, 1932 |
| 242,922 | Germany | May 21, 1911 |
| 284,372 | Germany | Apr. 10, 1913 |
| 468,140 | France | June 29, 1914 |
| 507,878 | Great Britain | June 22, 1939 |